United States Patent [19]

Cahn et al.

[11] Patent Number: 5,228,122
[45] Date of Patent: Jul. 13, 1993

[54] METHOD FOR BYPASSING USER UNWANTED DISPLAY SCREENS FROM A HOST CONTROLLED TERMINAL

[75] Inventors: Robert S. Cahn, Carmel, N.Y.; Elton B. Sherwin, Los Angeles, Calif.

[73] Assignee: International Business Machines Corporation, Armonk, N.Y.

[21] Appl. No.: 846,763

[22] Filed: Mar. 5, 1992

Related U.S. Application Data

[63] Continuation of Ser. No. 469,638, Jan. 24, 1990, abandoned.

[51] Int. Cl.$^5$ .............................................. G06F 15/62
[52] U.S. Cl. .................................... 395/155; 395/156
[58] Field of Search ................................ 364/518–522, 364/514, 200, 900; 340/717; 370/27; 395/155–158

[56] References Cited

U.S. PATENT DOCUMENTS

| | | | |
|---|---|---|---|
| 4,441,163 | 4/1984 | Leikam et al. | 364/900 |
| 4,750,137 | 6/1988 | Harper et al. | 341/173 X |
| 4,768,144 | 8/1988 | Winter et al. | 364/200 |
| 5,058,185 | 10/1991 | Morris et al. | 395/155 X |
| 5,081,449 | 1/1992 | Kurosu et al. | 395/155 X |

*Primary Examiner*—Gary V. Harkcom
*Assistant Examiner*—Almis Jankus
*Attorney, Agent, or Firm*—Whitham & Marhoefer

[57] ABSTRACT

A menu bypass system for an IBM 3270 type of display system. An IBM 3270 type display system includes a display terminal, a communications controller and a host computer running a host application which controls the terminal. The host computer and terminal communication use a protocol which allows the host to transmit data to and read data from the terminal at any time. After a transmission from the terminal to the host, the terminal is normally locked from further transmission until the host application responds. The menu bypass system allows transmission of request units generated by attention identifiers. These request units are stored in a queue and transmitted to the host one at a time in response to host commands. For certain host commands, such as erase/write, a previous write transmission from the controller to the terminal is aborted.

4 Claims, 3 Drawing Sheets

METHOD FOR BYPASSING USER UNWANTED DISPLAY SCREENS FROM A HOST CONTROLLED TERMINAL

This application is a continuation of application Ser. No. 07/469,638 filed Jan. 24, 1990, now abandoned.

BACKGROUND OF THE INVENTION

The present invention generally relates to information display systems, and more particularly to an improved method for bypassing user irrelevant screen updates in a system environment which implements IBM 3270 display system type of protocols between a host application and the display.

System guided dialogues using menu selection are commonly used in many data and word processing systems. Menu selection systems provide a means of selecting operations and retrieving information which reduces operator training requirements and the need for the operator to memorize complex command sequences. However, the necessity to sequentially cycle through a system-ordered set of user unneeded menu displays or other displays can be time consuming and can contribute to operator boredom as the operator gains experience.

Bypassing user unneeded but system dictated screen displays is particularly desirable in certain types of systems, such as the IBM 3270 information display system, where there may be a significant amount of time required for communication between a host application and a display terminal. In this type of system the display terminal or personal computer communicates with a host processor application program via a display controller. Systems of IBM 3270 information display type use a half-duplex session protocol between the display and the host application. This half-duplex protocol is implemented in different ways depending on whether a terminal is: a) attached to a controller which is channel attached to the host processor; b) attached to a controller which is connected to a communication controller using synchronous data link control protocols; or c) attached to a controller which is connected to a communication controller using binary synchronous communication protocols. In all cases the terminal requires permission of the host application to transmit data while the host application is free to transmit data to the display or read data from the display at any time. After a transmission from the display terminal to the host application, system protocols lock the terminal from a further transmission until the application can decide on an action and that action is transmitted back to the display.

The host application assumes that the last screen it transmits is currently displayed except for user modifications. IBM 3270 display system protocols and terms used herein are more fully described in "IBM Information Display System Data Stream Programmers Reference," IBM Publication No. GA23-0059-0. It will be appreciated that in a system which uses such protocols, in certain situations, ambiguous data may result if the keyboard were unlocked and data screens were aborted. For example, in a sequence of host commands: erase write; write; read buffer; if the original erase write were to sets fields not altered by the write, the read buffer command would read incorrect fields if the original erase write were aborted.

DESCRIPTION OF THE PRIOR ART

Display screen bypass can be achieved in an IBM 3270 type environment with a so-called "two screen" protocol convertor compatible with the IBM 3270 type display system protocols. The Yale Installed User Product and the IBM 7171 ASCII Device Attachment Control Unit are examples of such convertors. In two-screen protocol convertors, the protocol convertor keeps both the screen altered by the terminal and the last screen sent by the host in memory. With this type of protocol convertor, the keyboard is not locked after transmission to the host. When multiple immediate data are sent from the terminal to the protocol convertor the convertor can forward them to the host application after each screen reaches the convertor. If a screen update reaches the convertor before the screen is written to the terminal, the remainder of the screen write is omitted and a new screen with the update is begun. It is not necessary to send the update to the terminal since the screen is stored in the protocol convertor. This two-screen method of screen display bypass requires the protocol convertor or control unit to interpret the data stream at the presentation service level and maintain two large data structures for each logical unit session. This is not a useful approach in many environments and further it is mostly effective for locally attached convertors. With a slow link from the convertor to the host, this prior art menu bypass is less effective.

SUMMARY OF THE INVENTION

It is therefore an object of this invention to provide a method for bypassing user unwanted screen displays in display terminals connected to an IBM 370 class of host processor using IBM 3270 display system protocols without changing the order of data transmitted from the terminal to the host and without intermediate storage of display screen data.

Another object is the provision of a bypass technique which is transparent to the host application.

Briefly, this invention contemplates an improved screen bypass system for the IBM 3270 display system environment. As explained more fully above, in this environment a display terminal is under control of a host application program resident in a host processor remote from the terminal. The host and display communicate via a display controller in a half-duplex session protocol. The terminal requires host application permission to transmit data and after a transmission the terminal is locked until the host application responds. In accordance with this invention, the terminal is unlocked to allow transmission of certain attention identifiers generated by a user from a keyboard, such as would be generated, for example, using a program function (pf), program attention, clear, or enter key, which do not contain data fields. These attention identifiers in the IBM 3270 display protocol generate request units (herein also referred to as menu bypass data) usually comprised of a few bytes that contain control information. These request units are queued at a memory bypass agent located at the communications controller or further upstream in the communications link. The request units are transmitted in order, one at a time, to the host after each response to a previously transmitted character. If the host response catches up with a previous outbound transmission to the display terminal and includes a screen erase write command followed by an unlock character, any incomplete previous screen write operation is aborted.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENT OF THE INVENTION

Figure 1:
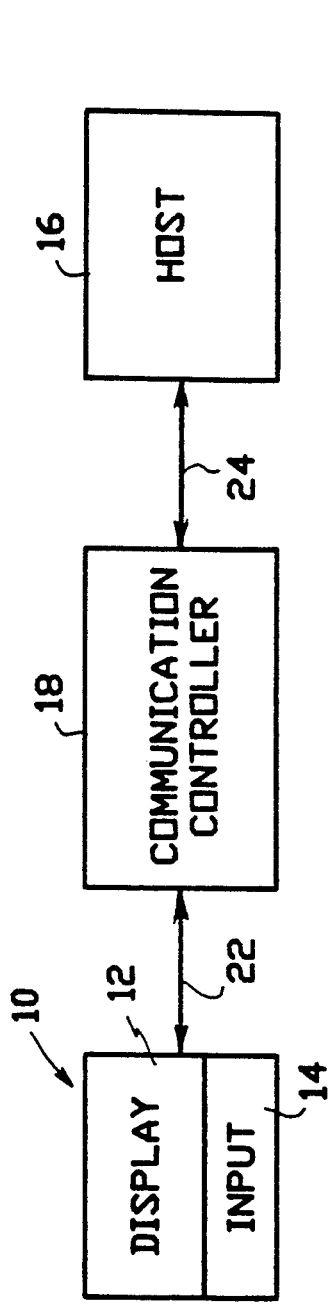
FIG. 1 is a generalized block diagram intended to illustrate the IBM 3270 display system environment.

Referring now to FIG. 1, a display system of the IBM 3270 type in which this invention has particular utility includes a display terminal indicated by the general reference numeral 10. Terminal 10 typically includes a display screen 12 and an input device 14, such as a keyboard. An application program running on a host processor 16 controls the display terminal 10 and communication between terminal and host are via a communication controller 18. A communication link 22 couples the terminal 10 to controller 18 and a link 24 couples the controller to the host 16. A half-duplex protocol is maintained between the host 16 and terminal 10. The display 10 must have permission of the application program running on host 16 for transmission to the host, while the host application can transmit data to or read data from terminal 10 at any time. The protocol locks the input 14 after every transmission from terminal 10.

Communication links of various speeds are used for links 22 and 24 depending on user requirements, system geography and cost. Typically, the link 24 is a 9.6 k baud leased line. Link 22 in some cases is a high-speed coaxial link and in other systems may be a relatively low speed 1200 baud asynchronous or synchronous data link.

Those skilled in the art will recognize that the foregoing very general description applies to the IBM 3270 display systems environment. While this invention can be most readily understood with reference to the IBM 3270 display system environment, it is not limited thereto, and is applicable to display systems with similar operating protocols.

Referring now to FIG. 2, in accordance with this invention a menu bypass is accomplished by modifying the protocol so that terminal 10 operates as a menu bypass terminal 10' in which request units generated in response to an attention identifier character (e.g., an immediate key) are transmitted to a menu bypass agent 26 when the terminal would be otherwise locked. The menu bypass agent 26 queues the request units and transmits them to the host 16 one request unit at a time, after each host response. The order of data flow to the host is the same as in IBM 3270 display system protocols without the menu bypass feature of this invention. If a host response includes certain commands, such as an erase write command to the terminal display and a terminal unlock command, the menu bypass agent aborts further transmission from the controller to terminal of any previous write to screen command data, either by altering the chaining of the outbound data or by issuing an explicit abort command to the terminal.

Figure 2A:
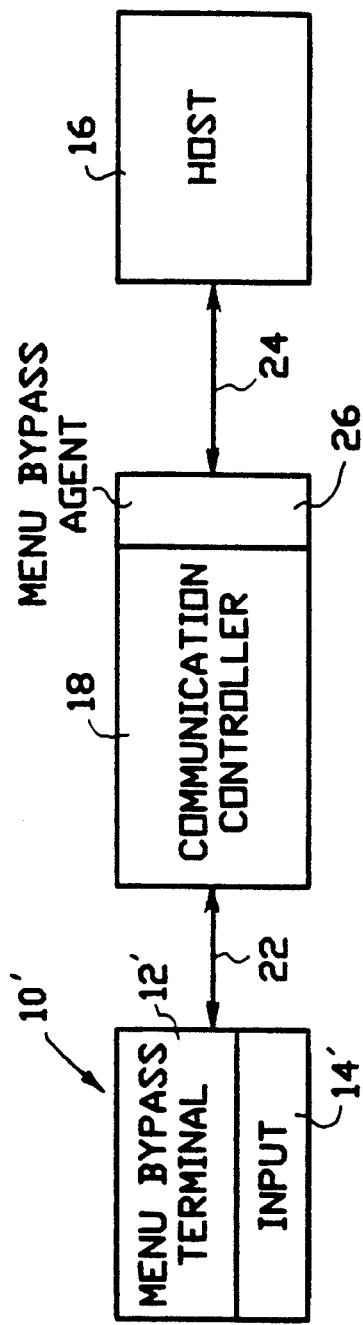
FIGS. 2a and 2b are general block diagrams illustrating a display system similar to FIG. 1 but incorporating the menu bypass feature of this invention.
Figure 2B:
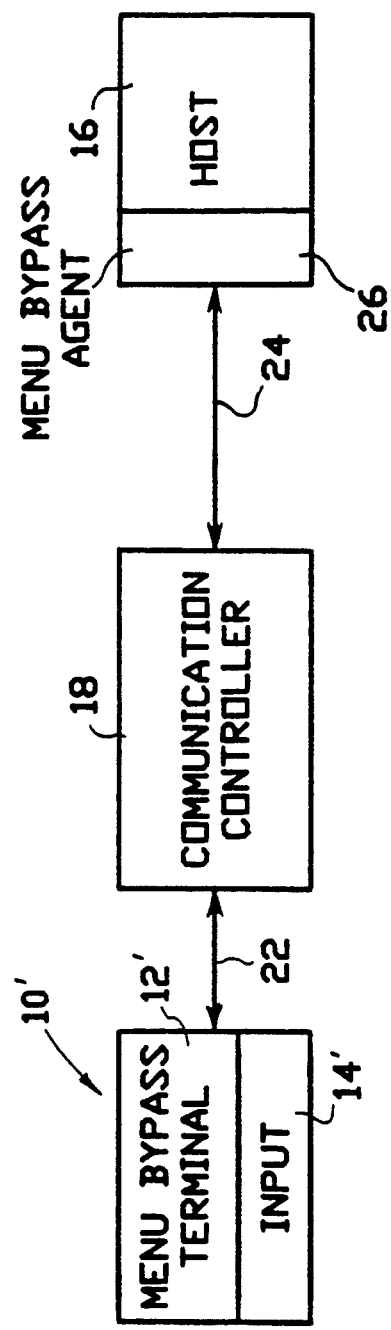

If the communications link 22 is slow relative to the communications link 24, the menu bypass agent 26 is located advantageously at the same point in the communications channel as the controller 18. This arrangement is shown in FIG. 2a. If the link 22 is fast relative to link 24, the menu bypass agent is advantageously located further upstream in the communication path, adjacent host 26, as shown in FIG. 2b.

In a specific embodiment of the invention, menu bypass terminal 10' may be a terminal or personal computer such as is used in the prior art IBM 3270 data display systems with a microcode modification to add a "menu bypass" state to the "inbound" and "outbound" states of existing terminals. In the "inbound" state, the terminal 10' can transmit inbound request units to the controller in response to an attention identifier character. Subsequent to each such inbound transmission, terminal 10' is in an "outbound" state in which transmission of further characters from input 14' would be locked, although these characters may be stored in a local buffer memory. The menu bypass microcode recognizes the attention identifier character and places a terminal 10', which had been in an "outbound" state, in "menu bypass" state. In this state a request unit generated in response to the attention identifier character is transmitted to the menu bypass agent.

The menu bypass agent 26 in an IBM 3270 type display system environment will be a program routine installed typically at the communication controller or at the host (e.g., added to an IBM Virtual Telecommunications Access Method application program) depending on the relative speed of the communications links as discussed in connection with FIGS. 2a and 2b. The bypass agent 26 functions to: a) store menu request units (i.e., menu bypass data) in a first in first out queue; b) transmit the stored request units one unit at a time in response to outbound host data streams, and c) abort a current incompletely transmitted host write data stream when an examination of the next host response is such that aborting the previous stream cannot result in a data ambiguity.

It will be appreciated that the menu bypass agent is in one of the following states: a) "unqueued" in which no menu bypass data characters are stored in the buffer; b) "single queued" in which there is one menu bypass data character stored in the menu bypass agent; and c) "multiple queued" in which there is more than one menu bypass data character stored.

In an "unqueued" state the menu bypass agent does not alter the data stream between terminal and host application.

In "single queued" and "multiple queued" states, menu bypass agent action is in response to the output transmission from the host. In a single queued state the menu bypass agent may abort previous screens in response to subsequent write commands more generally than in a multiple queued state.

In a specific embodiment of the invention for the IBM 3270 display system environment, the menu bypass agent 26 responds to the following host outbound IBM 3270 display system transmissions: WRITE COMMANDS; READ MODIFIED; READ MODIFIED ALL; READ BUFFER; ERASE/WRITE; ERASE/WRITE ALTERNATE; WSF; READ MODIFIED; READ MODIFIED ALL; READ BUFFER. The response for each state of the menu bypass agent is as follows:

For the "single queued" state, the actions are:

| HOST COMMAND | MENU BYPASS AGENT ACTION |
| --- | --- |
| ANY WRITE COMMAND | When the complete outbound data stream has passed through the menu bypass agent the next queued input is released to the host application if in the outbound data stream there is a write control character and if the Keyboard-restore bit is set. |
| READ MODIFIED | When the complete outbound data stream in response to the read modified command has reached the menu bypass agent the queued input is released to the host application. |
| READ MODIFIED ALL | Same as read modified. |
| READ BUFFER | The queued menu bypass data is discarded. |

For "multiple queued" state, the actions are:

| HOST COMMAND | MENU BYPASS AGENT ACTION |
| --- | --- |
| WRITE | When the complete outbound data stream has passed through the menu bypass agent the next queued input is released to the host application if in the outbound data stream there is a write control character and if the Keyboard-restore bit is set. |
| ERASE WRITE or ERASE WRITE ALTERNATE | When the complete outbound data stream has reached the menu bypass agent the queued input is released to the application if there is a write control character and if the keyboard-restore bit is set. Any outbound transmission from the menu bypass agent to the menu bypass controller is aborted and transmission of the new command is started. If there is only a single queued item the menu bypass agent enters the single queued state. If the Keyboard-restore bit is cleared then the sound-alarm bit of write control character is set and the menu bypass data is discarded. |
| WRITE STRUCTURED FIELD (WSF) | If the WSF contains a single structured field which is outbound 3270 data stream with the correct PID then the stream is treated the same as a write or read command. |
| READ MODIFIED | When the complete outbound data stream has reached the menu bypass agent the queued input is released to the application. The menu bypass agent enters single queued state if only a single menu bypass data remains in the queue, otherwise it stays in multiple queued state. |
| READ MODIFIED ALL | Same as read modified. |
| READ BUFFER | The queued menu bypass data is discarded. The read buffer command is chained behind a WRITE command whose write control |

| HOST COMMAND | MENU BYPASS AGENT ACTION |
| --- | --- |
| | character specifies that the keyboard remain locked and that the alarm be sounded. The menu bypass controller or DFT terminal will prepare the inbound data stream. The menu bypass agent enters unqueued state. |

Figure 3A:
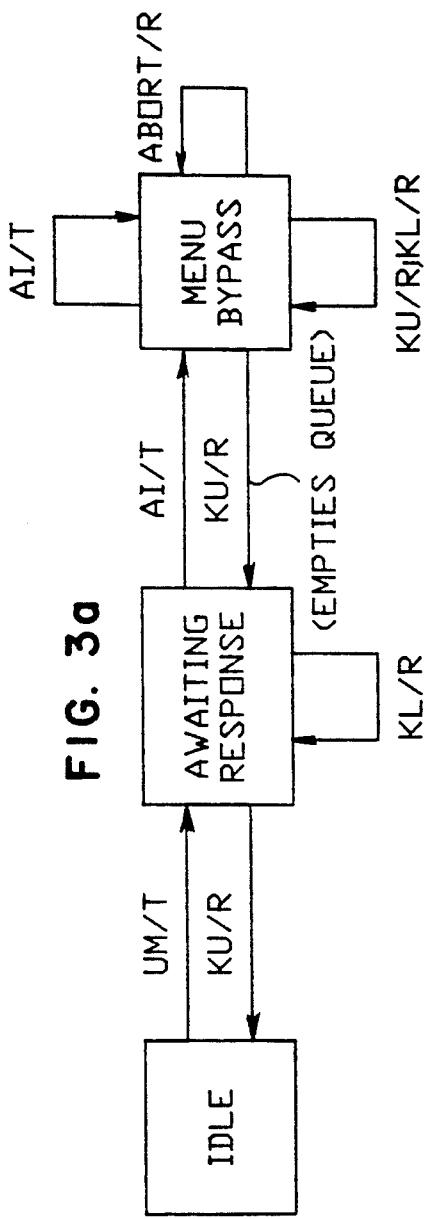
FIGS. 3a and 3b are state diagrams respectively for the terminal and bypass agent implementing menu bypass in accordance with the teaching of this invention.

FIG. 3a graphically illustrates the three states of the menu bypass terminal: "Idle," "Await Resp" and "Menu Bypass." A user message (UM/T) places the terminal in its "awaiting response" state in which the terminal is locked, awaiting a host response that includes an unlock command. In this state the terminal cannot transmit further user messages. However, as previously explained, attention identifier request units (AIs) may be transmitted, and transmission of such an attention identifier request unit places the terminal in its menu bypass state (Menu Bypass). The terminal (which conveniently includes an appropriate counter) remains in a menu bypass state so long as there are transmitted attention identifier request units to which there has been no response.

As represented by the "U" shaped arrows, an abort response (Abort/R) does not change the terminal state from its "Menu Bypass" state. Similarly, host responses keyboard locked (KL) and keyboard unlocked (KU) do not change the terminal state from menu bypass so long as there is an attention identifier request unit that is unresponded to.

A host response keyboard unlock (KU) or keyboard lock (KL) which results in the queue of attention identifier request units becoming empty, causes a change of state to the Awaiting Response state. As indicated by the "U" shaped arrow, in the awaiting response state, a host response, keyboard locked (KL) does not change the state of a terminal in the state. A host response, keyboard unlocked (KU) does change the state to the Idle state.

Figure 3B:
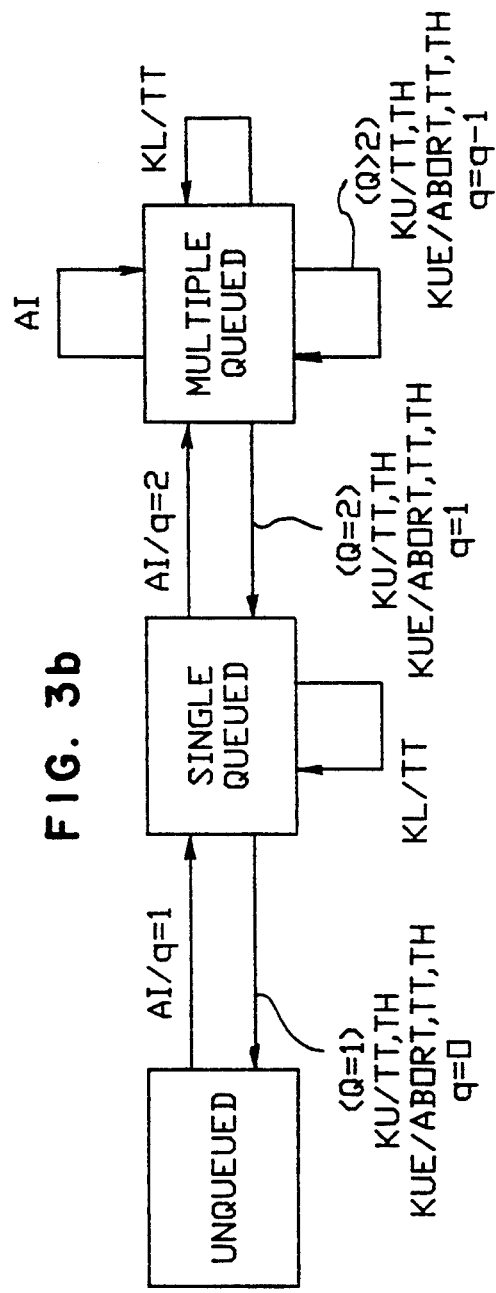

Referring now to FIG. 3b, the menu bypass agent has three possible states: Unqueued; Single Queued and Multiple Queued. An attention identifier request unit (AI) changes the agent from its Unqueued to Single Queued state. In the Single Queued state a subsequent AI changes the agent to its Multiple Queued state.

In the Multiple Queued state of the menu bypass agent, a host response, keyboard locked (KL) is transmitted to the terminal but does not change the Multiple Queued state of the bypass agent.

If the number of AIs in the queue is greater than two (q>2), the host responses; keyboard unlocked (KU) and keyboard unlock erase screen (KUE) do not change the state of the bypass agent. A keyboard unlock response transmits the new screen to the terminal and the next AI in the queue is transmitted to host. A keyboard unlock erase screen response aborts the prior screen, transmits the new screen to the terminal, and transmits the next AI in the queue to the host.

If the number of queued user commands is two (q=2), the host responses of keyboard unlock (KU) and keyboard unlock erase screen (KUE) transfer the bypass agent to a Single Queued state. Response to host command in the Single Queued state is the same as in a Multiple Queued state; however, here a host response keyboard unlock or host response keyboard unlock, erase screen command transfers the bypass agent to an Unqueued State.

Figure 4:
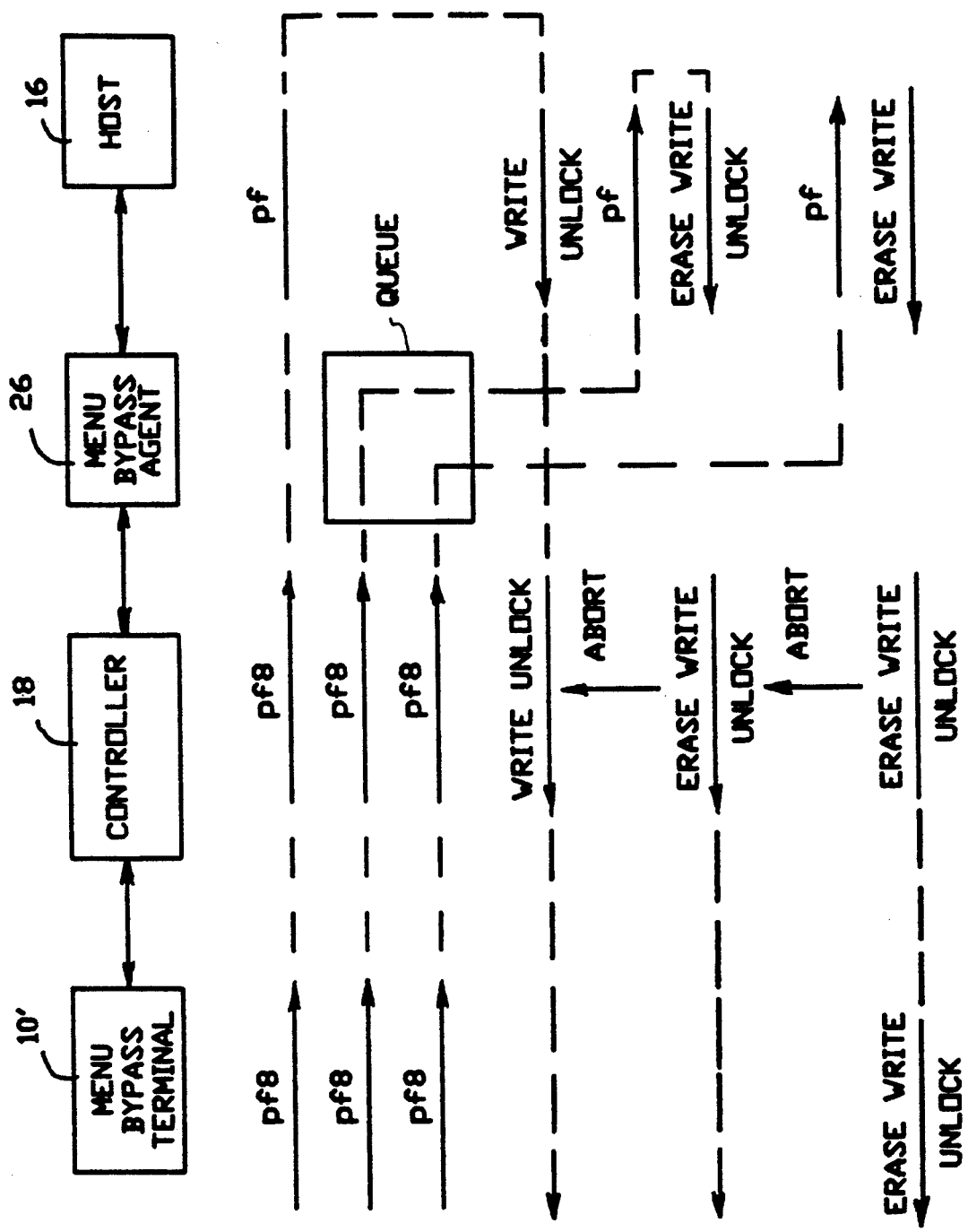
FIG. 4 is a diagram illustrating an exemplary sequence of data flow in an IBM 3270 type display system implementing this invention.

FIG. 4 illustrates the operation of the invention in which a user wishes to scroll ahead three screens in an editor in which a program function key character (pf8) calls for the host application to write the next screen. The user strikes the pf8 key three times in succession.

The two pf8 characters are queued at the menu bypass agent. When the first WRITE reaches the menu bypass agent it checks that the Write Control character specifies that the keyboard is to be unlocked. When the full outbound data stream has reached the menu bypass agent it releases the next stored write character to the last application. When the second outbound command from the host reaches the menu bypass agent it checks for two conditions:

The command is an ERASE WRITE or ERASE WRITE ALTERNATE or WRITE STRUCTURED FIELD. If the command is WRITE STRUCTURED FIELD, the menu bypass agent checks that the structured field is of type 40 (outbound 3270 DS) and that the partition ID is the same as the last WRITE STRUCTURED FIELD and the command is ERASE WRITE or ERASE WRITE ALTERNATE.

There is a WRITE CONTROL CHARACTER and it specifies Keyboard Restore.

If the outbound data stream meets these criteria then the next queued menu bypass character (pf8) is released to the host application when the entire outbound data stream has arrived at the menu bypass agent. In this example, the second pf8 is released by the menu bypass agent and the host responds with an ERASE WRITE which arrives at the menu bypass agent before the first outbound data stream has been transmitted to the menu bypass controller. Consequently the menu bypass agent aborts the complete transmission of the first WRITE command. It also releases the last pf8 key to the application. The example finishes with the menu bypass agent aborting the second transmission and transmitting the third.

While the invention has been described in terms of several preferred embodiments, those skilled in the art will recognize that the invention may be practiced with modification within the spirit and scope of the appended claims.

We claim:

1. In a system having a display terminal with a user input device that has an attention identifier character input that generates a request unit, said display terminal being under control of a host application program in which a protocol between the host application program and the display terminal allows the host application program to transmit a write data stream and a host command to, or read data from, the terminal at any time and locks the terminal from further transmission after each terminal transmission until there is a host application program response to a terminal transmission, a method for bypassing user unwanted display screens, comprising the steps of:

examining user inputs of the terminal to detect an attention identifier character input;

transmitting a request unit generated by an attention identifier character input from said terminal to a queue buffer memory even if the terminal is awaiting a response to a previous transmission from said terminal;

storing a transmitted request unit transmitted in said next previous transmitting step in said queue buffer memory;

transmitting a request unit from said queue buffer memory to said host application in response to each host command to said terminal;

examining each said host command to identify a host command of a type whereby a previous write data stream can be aborted without resulting in ambiguous data; and aborting transmission to the terminal of a previous write data stream in response to a request unit generated by said attention identifier character input and transmitted to said host application program from said queue buffer memory if said examining step identifies a host command as a host command whereby aborting the previous write data stream will not result in ambiguous data.

2. In a system having a display terminal with a user input device that has an attention identifier character input that generates a request unit, said display terminal being under control of a host application program in which a protocol between the host application program and the display terminal allows the host application program to transmit a write data stream and a host command to, or read data from, the terminal at any time and locks the terminal from further transmission after each terminal transmission until there is a host application program response to a terminal transmission, a method for bypassing user unwanted display screens, comprising the steps of:

examining user inputs at the terminal to detect attention identifier character input;

transmitting a request unit generated by an attention identifier character input from said terminal to a queue buffer memory even if the terminal is awaiting a response to a previous transmission from said terminal;

storing a transmitted request unit transmitted in said next previous transmitting step in said queue buffer memory;

transmitting a request unit from said queue buffer memory to said host application in response to each host command to said terminal;

examining each said host command to identify an erase-write host command; and aborting transmission to the terminal of a previous write data stream in response to a request unit generated by said attention identifier character input and transmitted to said host application program from said queue buffer memory if said examining step identifies a host command as an erase-write host command and said queue buffer memory contains multiple request units.

3. In a system having a display terminal with a user input device that has an attention identifier character input that generates a request unit, said display terminal being under control of a host application program in which a protocol between the host application program and the display terminal allows the host application program to transmit a write data stream and a host command to, or read data from, the terminal at any time and locks the terminal from further transmission after each terminal transmission until there is a host application program response to a terminal transmission, a system for bypassing user unwanted display screens, comprising:

means for examining user inputs to identify an attention identifier input character;

means for transmitting a request unit generated by an attention identifier character input from said terminal to a queue buffer memory even if the terminal is awaiting a response to a previous transmission from said terminal;

means for storing a transmitted request unit transmitted in said next previous transmitting step in said queue buffer memory;

means for transmitting a request unit from said queue buffer memory to said host application in response to each host command to said terminal; and means for examining each said host command to identify a host command of a type whereby a previous write data stream can be stored without resulting in ambiguous data; and means for aborting transmission to the terminal of a previous write data stream in response to a request unit generated by said attention identifier character input and transmitted to said host application program if said examining step identifies a host command as a host command whereby aborting the previous write data stream will not result in ambiguous data.

4. In a system having a display terminal with a user input device that has an attention identifier character input that generates a request unit, said display terminal being under control of a host application program in which a protocol between the host application program and the display terminal allows the host application program to transmit a write data stream and a host command to, or read data from, the terminal at any time and locks the terminal from further transmission after each terminal transmission until there is a host application program response to a terminal transmission, a system for bypassing user unwanted display screens, comprising:

means for examining user inputs to identify an attention identifier input character;

means for transmitting a request unit generated by an attention identifier character input from said terminal to a queue buffer memory even if the terminal is awaiting a response to a previous transmission from said terminal;

means for storing a transmitted request unit transmitted in said next previous transmitting step in said queue buffer memory;

means for transmitting a request unit from said queue buffer memory to said host application in response to each host command to said terminal;

means for examining each said host command to identify an erase-write host command; and means for aborting transmission to the terminal of a previous write data stream in response to a request unit generated by said attention identifier character input and transmitted to said host application program if said examining step identifies said host command as an erase-write host command and said queue buffer memory contains multiple request units.

\* \* \* \* \*